United States Patent [19]
Cotton et al.

[11] Patent Number: 5,688,588
[45] Date of Patent: Nov. 18, 1997

[54] WATER PURIFICATION DEVICE

[75] Inventors: James Dennis Cotton, Marietta; Dennis Stein Everhart, Alpharetta; Elizabeth Deibler Gadsby, Mareitta, all of Ga.

[73] Assignee: Kimberly-Clark Worldwide, Inc., Neenah, Wis.

[21] Appl. No.: 631,512

[22] Filed: Apr. 12, 1996

[51] Int. Cl.⁶ .............. A61J 15/00; B01D 24/08; B01D 27/02
[52] U.S. Cl. .............. 428/305.5; 210/282; 210/289; 210/484; 210/497.2; 210/501; 210/502.1; 210/504; 210/505; 239/33; 428/311.11
[58] Field of Search .............. 239/33; 210/484, 210/497.2, 282, 289, 501, 502.1, 504, 505; 428/305.5, 311.11

[56] References Cited

U.S. PATENT DOCUMENTS

| | | | |
|---|---|---|---|
| 4,564,452 | 1/1986 | Sharpe | 210/497.2 |
| 4,800,018 | 1/1989 | Moser | 210/266 |
| 4,925,601 | 5/1990 | Vogt et al. | 264/6 |
| 4,961,415 | 10/1990 | Radwanski et al. | 131/332 |
| 4,973,503 | 11/1990 | Hotchkiss | 428/36.4 |
| 4,995,976 | 2/1991 | Vermes et al. | 210/266 |
| 5,273,649 | 12/1993 | Magnusson et al. | 210/232 |

*Primary Examiner*—James C. Cannon
*Attorney, Agent, or Firm*—Karl V. Sidor

[57] ABSTRACT

A drinking straw that purifies water by forced movement of water through the straw. The straw is composed of: 1) a filter plug made of a fibrous structure, the filter plug having sides, a first end, a second end, and a firmness sufficient to avoid collapse of the fibrous structure under a specified pressure drop; 2) a water purification material integrated in the fibrous structure; and 3) a liquid impervious wrapper covering the sides of the filter plug, the wrapper defining openings at the first and second ends of the filter plug.

37 Claims, 4 Drawing Sheets

WATER PURIFICATION DEVICE

FIELD OF THE INVENTION

The present invention relates to water purification. Generally speaking, water purification can be understood to include disinfection or removal of harmful contaminants or both.

BACKGROUND OF THE INVENTION

Due to the worldwide growth in population and industrialization, along with natural disasters, world supplies of safe drinking water are dwindling. Key pollutants that pose a threat to humans via polluted water consumption are, pathogens (bacteria and viruses), organics, halogenated organics and heavy metals. Conventional water filters are commonly used in American households to remove water impurities and to provide cleaner, more aesthetically pleasing drinking water. However, there are numerous limitations that make these systems difficult to use. They are expensive, bulky, difficult to install and replace, can harbor growth of harmful organisms, are inconvenient, and none claim to remove or kill 100 percent of all pathogens, although most are effective in removing some organics (including halogenated organics) as well as some heavy metals.

Small disposable filters such as those sold under the trade designation Brita®, are expensive by world standards. They can also be somewhat cumbersome to use. A distinct drawback to these types of filtration devices is that they are designed for use in water which is microbiologically safe. That is, the devices are not designed to remove pathogens because it is assumed that the water is pathogen free. Additionally, these devices have only limited utility in the removal of harmful substances such as, for example, heavy metals.

It is difficult for many people in the world, including world travelers, to obtain safe drinking water without having to endure the inconvenience of disinfecting it by either boiling it or through the use of iodine-based disinfectants.

It is clear that there exists a distinct need for a simple, economical, one-step article which allows a consumer to disinfect or otherwise purify water. That is, there is a distinct need for a single-use, disposable article which is simple to use and which allows a consumer to purify water to drink.

SUMMARY OF THE INVENTION

The present invention addresses some of the difficulties and problems discussed above by providing a drinking straw that purifies water by forced movement of water through the straw. The straw is composed of: 1) a filter plug made of a fibrous structure, the filter plug having sides, a first end, a second end, and a firmness sufficient to avoid collapse of the fibrous structure under a filter pressure drop of from about 0.5 to about 4.0 cm water/cm filter plug length; 2) a water purification material integrated in the fibrous structure; and 3) a liquid impervious wrapper covering the sides of the filter plug, the wrapper defining openings at the first and second ends of the filter plug.

According to the invention, the fibrous structure may be selected from a nonwoven web of meltblown fibers, a nonwoven web of spunbond filaments, a bonded-carded web, a fibrous batt, a filament tow and an airlaid web. In an embodiment of the invention, the nonwoven web of meltblown fibers may further include one or more other materials including, for example, textile fibers, wood pulp fibers, particulates, activated carbons, zeolites, and adsorbent material. The fibrous structure (e.g., fibrous material) may be formed from a thermoplastic polymer. For example, thermoplastic polymer may be selected from polyolefins, polyamides and polyesters. The polyolefin may be selected from polyethylene, polypropylene, polybutene, ethylene copolymers, propylene copolymers, and butene copolymers and blends of the same. In one aspect of the invention, at least a portion of the fibrous structure (e.g., fibrous material) may be a multi-component or bi-component material selected from multi-component or bi-component fibers and multi-component or bi-component filaments. It is contemplated that at least a portion, if not all, of these fibers may be crimped and/or textured.

The filter plug portion of the drinking straw may have a diameter ranging from about 5 mm to about 20 mm. Desirably, the diameter may range from about 5 mm to 15 mm. The filter plug portion of the drinking straw may have a firmness value of about 0.3 to about 0.8 millimeters deflection.

According to the invention, the water purification material integrated into the fibrous material may be chemically charge-modified. For example, the chemically charge-modified water purification material may contain a chemical charge modifier selected from polyvalent cations, cationic polymers, and positively-charged particles. The chemical charge modifier may be selected from polyvalent cations, cationic polymers, and positively-charged particles. As an example, the chemical charge modifiers may be polyvalent cations including, but not limited to, $Ca^{2+}$, $Al^{3+}$, and $Bi^{3+}$. The chemical charge modifiers may also be positively-charged particles such as, for example, single metal hydroxides, mixed metal hydroxides, and sol-gels. Exemplary positively-charged particles include $AlO(OH)$, $Bi(OH)_3$ and co-depositions of $Fe(OH)_3$ and $Mg(OH)_2$. The chemical charge modifiers may also be cationic polymers such as, for example, quaternary amine containing cationic resins, aliphatic amines having at least one primary amine and/or secondary amine, and the like. For example, the cationic polymer may be polyamine epichlorohydrin. According an aspect of the invention, the chemical charge modifiers may be cationic polymer systems composed of a primary polymer material and a secondary polymer material.

The liquid impervious wrapper surrounding the filter plug may be a latex saturated cellulose sheet, a wax saturated cellulose sheet, a plastic film or similar material. The liquid impervious wrapper may be a non-structural component of the drinking straw (i.e., providing little or no structural integrity other than to hold the filter plug together).

According to the invention, the drinking straw may be made of multiple filter plugs arranged in series. The drinking straw may also include an adsorbent particulate material. In an embodiment of the invention, the adsorbent particulate material may be located between filter plugs.

The drinking straw of may also include a disinfectant incorporated in at least a portion of the filter plug, the disinfectant being adapted to render harmless a substantial portion of pathogens contained in the water as it moves through the drinking straw. The disinfectant may be selected from solid iodine, iodine compounds, phenols, halazone or quaternary ammonium compounds. The pathogens that may be acted upon by the disinfectant include, for example, *Vibrio cholerae, Giardia lamblia,* Cryptosporidium, Salmonella, fecal coliforms, reovirsus, adenoviruses and human enteric viruses such as polio, hepatitis A and coxsackie.

The present invention encompasses a device that purifies contaminated water by forced movement of water through the device. The device includes: 1) at least one filter plug composed of a fibrous structure, the filter plug having sides, a first end, a second end, and a firmness sufficient to avoid collapse of the fibrous nonwoven structure under a filter pressure drop of from about 0.5 to about 22 cm water/cm filter plug length; 2) a water purification material integrated in the fibrous structure; and 3) a liquid impervious wrapper covering the sides of each filter plug, the wrapper defining openings at the first and second ends of the filter plug.

The fibrous structure may be selected from a nonwoven web of meltblown fibers, a nonwoven web of spunbond filaments, a bonded-carded web, a fibrous batt, a filament tow and an airlaid web. In an embodiment of the invention, the nonwoven web of meltblown fibers may further include one or more other materials such as, for example, fibrous and/or particulate materials.

According to the invention, the filter plug diameter of the water purification device may range from about 1 cm to about 10 cm (diameters greater than 10 cm are contemplated). For example, the diameter may range from about 1 cm to about 7 cm. As a further example, the diameter may range from about 1 to about 5 cm. In another aspect of the invention, the filter plug of the water purification device may have a firmness value of about 0.3 to about 0.8 millimeters deflection.

The water purification material may be chemically charge-modified. The chemically charge-modified water purification material may contain a chemical charge modifier selected from polyvalent cations, cationic polymers, and positively-charged particles.

The liquid impervious wrapper surrounding the filter plug may be a latex saturated cellulose sheet, a wax saturated cellulose sheet, a plastic film or similar material. The liquid impervious wrapper may be a non-structural component of the device (i.e., providing little or no structural integrity other than to hold the filter plug together).

According to the invention, the water purification device may be made of multiple filter plugs arranged in series. The water purification device may also include an adsorbent particulate material. In an embodiment of the invention, the adsorbent particulate material may be located between filter plugs. In an aspect of the present invention, several of the water purification devices may be arranged in parallel. Several of the water purification devices may be arranged in series as well.

The water purification device may also include a disinfectant incorporated in at least a portion of the filter plug, the disinfectant being adapted to render harmless a substantial portion of pathogens contained in the water as it moves through the water purification device.

The present invention also encompasses a drinking straw that removes waterborne pathogens from aqueous liquid by forced movement of water through the straw, in which the straw is composed of: 1) a filter plug made of a nonwoven web selected from a nonwoven web of meltblown fibers and nonwoven web of spunbond filaments, the filter plug having sides, a first end, a second end, and a firmness sufficient to avoid collapse of the nonwoven web under a pressure drop of from about 0.5 to about 22 cm water/cm filter plug length; 2) a chemical charge modifier integrated in the nonwoven web; and 3) a liquid impervious wrapper covering the sides of the filter plug, the wrapper defining openings at the first and second ends of the filter plug, so that when water containing waterborne pathogens is forced through the drinking straw, the waterborne pathogens are adsorbed onto the nonwoven web containing a chemical charge-modifier.

DETAILED DESCRIPTION OF THE INVENTION

As used herein, the term "filter plug" refers to a filtering component of a water purification device. Generally speaking, a filter plug may be formed from a fibrous structure such as, for example, a nonwoven fibrous web, fibrous bat, fiber or filament tow or the like. Alternatively and/or additionally, a filter plug may include or may be composed of particulates, porous solid materials or the like. A filter plug may have a length greater than its breadth and may be formed such that it has a one or more cross-sectional configurations including, but not limited to, circular, square, triangular, pentagonal, hexagonal, heptagonal or the like.

As used herein, the term "filter pressure drop" refers to the amount of vacuum (expressed in centimeters of water) required to draw approximately 0.17 L/min (170 cm$^3$/min) of water through a filter device. Generally speaking, the pressure drop is expressed in centimeters of water and may be normalized to unit length of filter by dividing by the actual filter length. In accordance with the invention, the pressure drop of a filter is desirably in the range of 0.5 to 22 cm water/cm filter length. More desirably, the pressure drop is in the range of from about 0.5 to 10 cm water/cm filter length. Even more desirably, the pressure drop is in the range of from about 0.5 to 5 cm water/cm filter length.

As used herein, the term "firmness" refers to the deflection of a deformable material (e.g., a filter plug) in response to an applied force. More particularly, the firmness of filter plug samples was measured using an Eastman Firmness Gauge (available from Eastman Chemical Products, Inc., Kingsport, Tenn., division of Eastman Kodak Company). This instrument applies a weight of 350 grams to a test filter. The weight was applied through the shaft of a dial indicator (available from the Federal Products Company, Providence, R.I.) to a circular foot having a diameter of about ½ inch (12.5 millimeters) positioned directly on the filter. The filter is placed below the foot which is lowered to contact the sample without the 350 gram weight being applied to the test filter. The dial indicator is adjusted to have the needle pointing to scale 0. The 350 gram weight is released by an off-set cam and applied to the filter. A reading of the Federal dial is taken after 5 seconds to determine the number of tenths of millimeter deflection. A reading of 10.0 means the test filter has been depressed 1.0 millimeter by the 350 gram weight. Generally speaking, a test result of between about 3 to 8 (i.e., 0.3 to 0.8 millimeter deflection) is a desirable range for filter plugs. More desirably, the test result is between 4 to 8 (i.e., 0.3 to 0.8 millimeter deflection).

Figure 1:
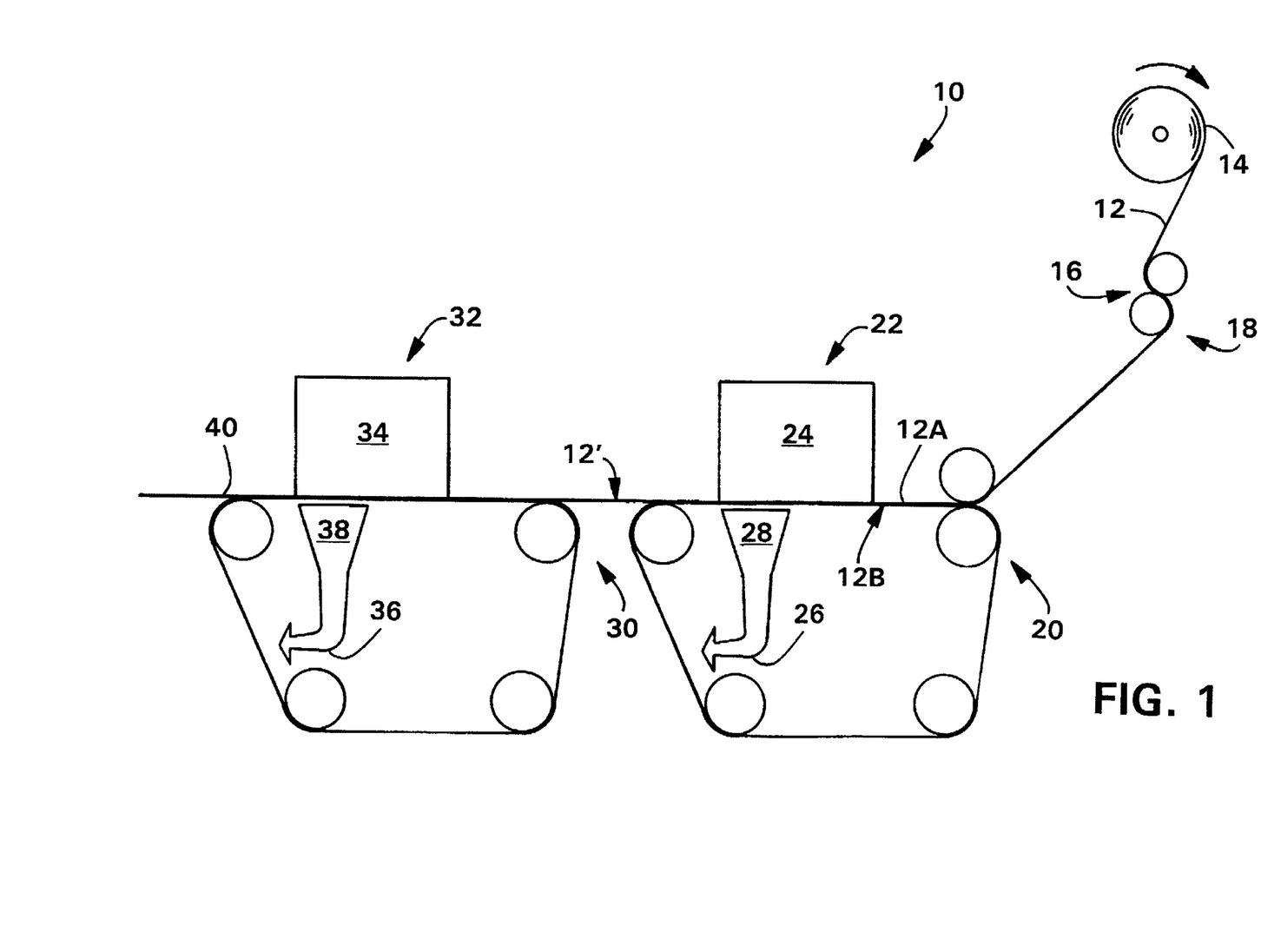
FIG. 1 is an illustration of an exemplary process of making a component of the present invention.

Referring to the drawings and in particular to FIG. 1, there is shown, not necessarily to scale, at 10 an exemplary method of making a water purification device that includes a filter plug composed of a fibrous material and an integrated water purification material.

According to the present invention, a fibrous structure (e.g., a fibrous nonwoven web, fiber batt, fiber tow or the like) 12 is unwound from a supply roll 14 and travels in the direction indicated by the arrow associated therewith as the supply roll 14 rotates in the direction of the arrows associated therewith. The fibrous structure 12 may be formed by one or more sheet making processes and passed directly into the process 10 without first being stored on a supply roll 14. Exemplary sheet-making processes include processes such as meltblowing processes, spunbonding processes, bonded-carded web-making processes, air-laying processes and the like.

The fibrous structure may be passed through a pretreatment station to modify the structure of the sheet. For example, the sheet may be calendered with a flat roll, point bonded or pattern bonded roll and/or aperturing roll in order to achieve desired strength, functional and/or textural properties. It is contemplated that at least a portion of a surface of the sheet could be modified by various known surface modification techniques. Exemplary surface modification techniques include, for example, chemical etching, chemical oxidation, ion bombardment, plasma treatments, flame treatments, heat treatments, and/or corona discharge treatments.

If the fibrous structure is a nonwoven fabric, it may be a nonwoven fibrous web such as, for example, a bonded carded web, spunbond web, web of meltblown fibers, fibrous batt, fibrous mat and/or multi-ply fibrous web containing the same type of fibrous web or a multi-ply fibrous web containing different types of fibrous webs. If the fibrous structure is a web of meltblown fibers, it may include meltblown microfibers. These nonwoven webs may be formed from thermoplastic polymers or thermoset polymers. If the nonwoven web is formed from a polyolefin, the polyolefin may be polyethylene, polypropylene, polybutene, ethylene copolymers, propylene copolymers and butene copolymers. Of course, other material such as, for example, cellulose acetate may be used. The fibers and/or filaments may be formed from blends that contain various pigments, additives, strengthening agents, flow modifiers and the like. Such fabrics are described in U.S. Pat. Nos. 4,041,203, 4,374,888, and 4,753,843, the contents of which are incorporated herein by reference. Those patents are assigned to the Kimberly-Clark Corporation, the assignee of the present invention.

Desirably, the fibrous structure will be adapted to have a level of firmness or integrity such that is resists collapse when subjected to a filter pressure drop. Generally speaking, fibrous structures can be formed with features such as, for example, relatively large diameter filaments deposited so they form rings or circular shapes that tend to resist compression or collapse. Exemplary fibrous structures of this type are described in U.S. Patent application Ser. No. 08/333,803, entitled "Spunbond Loop Material For Hook And Loop Fastening Systems" by Bullwinkel et al., filed on Nov. 3, 1994, the contents of which are incorporated by reference.

Alternatively and/or additionally, fibrous structures may be formed so they have agglomerated fibers or filaments that resist compression or collapse. Exemplary fibrous structures of this type are described in U.S. Pat. No. 4,961,415, entitled "Controlled Draft and Efficiency Filter Element for Smoking Articles" to F. R. Radwanski et al., issued on Oct. 9, 1990, the contents of which are incorporated by reference.

The fibrous structure may be a nonwoven web that may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and/or particulates such as, for example, activated carbon, silica, clay mineral and/or zeolite particulates occurs prior to collection of the meltblown fibers upon a collecting device to form a coherent web of randomly dispersed meltblown fibers and other materials such as disclosed in U.S. Pat. Nos. 4,100,324, and 5,350,624, the disclosure of which is hereby incorporated by reference.

If the fibrous structure is a nonwoven web, the fibrous material in the nonwoven web may be joined by interfiber bonding to form a coherent web structure. Interfiber bonding may be produced by entanglement between individual meltblown fibers, carded fibers, spunbond filaments and/or other fibrous materials. Some fiber entangling is inherent in the meltblown process, bonding-carding process and/or spunbond process but may be generated or increased by processes such as, for example, hydraulic entangling or needlepunching. Alternatively and/or additionally a bonding agent may be used to increase the desired bonding. If at least a portion of the fibrous material in the fibrous structure is cellulosic fibrous material, some interfiber bonding may be attributable to "paper" bonding.

The fibrous structure may have a basis weight ranging from about 6 gsm to about 400 gsm. For example, the fibrous structure may have a basis weight ranging from about 12 gsm to about 250 gsm. Desirably, the fibrous structure may have a basis weight ranging from about 17 gsm to about 102 gsm. It is contemplated that, after processing, any number of treated fibrous structures may be joined together or treated fibrous structures may be joined to other materials to form a consolidated material that may have a basis weight within the range of 6 gsm to 400 gsm or even greater (e.g., 400 gsm or more).

According to the invention, a water purification material is integrated into the fibrous structure. The water purification material integrated into the fibrous structure may be chemically charge-modified. For example, the chemically charge-modified water purification material may contain a chemical charge modifier selected from polyvalent cations, cationic polymers, and positively-charged particles.

The chemical charge modifier can be selected from polyvalent cations, cationic polymers, and positively-charged particles. As an example, the chemical charge modifiers may be polyvalent cations including, but not limited to, $Ca^{2+}$, $Al^{3+}$, and $Bi^{3+}$. The chemical charge modifiers may also be positively-charged particles such as, for example, single metal hydroxides, mixed metal hydroxides, and sol-gels. Exemplary positively-charged particles include $AlO(OH)$, $Bi(OH)_3$ and co-depositions of $Fe(OH)_3$ and $Mg(OH)_2$. The chemical charge modifiers may also be cationic polymers such as, for example, quaternary amine containing cationic resins, aliphatic amines having at least one primary amine and/or secondary amine, and the like. For example, the cationic polymer may be polyamine epichlorohydrin. According to an aspect of the invention, the chemical charge modifiers may be cationic polymer systems composed of a primary polymer material and a secondary polymer material.

When the fibrous structure is formed from a low surface energy material such as, for example, a polyolefin, the low surface energy material may need to be primed or treated with a surface functionalization reagent. This reagent could allow for the more homogeneous incorporation of a chemical charge modifier. Amphiphilic macromolecules are one class of surface functionalization reagents known to effectively prepare low surface energy materials such as polyolefins for chemical charge modification. A more detailed description of this subject matter is contained in U.S. Pat. No. 5,494,744, entitled "Method of Applying a Protein Coating to a Substrate and Article Thereof", which is assigned to the assignee of the present application, the contents of which are incorporated by reference in their entirety.

A description of an exemplary process of applying chemical charge modifiers to an amphiphilic macromolecule (e.g., amphiphilic protein) coated substrate may be found in U.S. patent application Ser. No. 08/548,855, filed on Oct. 25, 1995, entitled "Method of Applying Chemical Charge Modifiers to a Substrate and Article Thereof", the contents of which are incorporated by reference.

In an exemplary process, an amphiphilic macromolecule coating can be applied to a generally hydrophobic substrate and then a chemical charge modifier may be applied to the amphiphilic macromolecule coating.

In one such process, a fibrous structure 12 passes through the nip 16 of an S-roll arrangement 18 in an S path. From the S-roll arrangement 18, the fibrous structure 12 passes to a means for continuously advancing 20 the fibrous structure throughout the process. Generally speaking, the means for continuously advancing 20 the fibrous structure may be, for example, a moving foraminous belt, a permeable fabric, netting, webbing or the like. It is contemplated that the fibrous structure 12 may be self-supporting and need not be transported on a moving belt.

The fibrous structure 12 then passes under a means or device 22 for providing an aqueous solution containing amphiphilic macromolecules. Generally speaking, the amphiphilic macromolecules may be amphiphilic proteins. The aqueous solution of amphiphilic macromolecules (e.g., amphiphilic proteins) should have a relatively high surface tension (i.e., the aqueous solution of amphiphilic proteins should have a surface tension of about 45 dynes/cm or greater). The means for providing an aqueous solution containing amphiphilic macromolecules distributes the aqueous solution substantially across and onto a first surface 12A of the continuously advancing fibrous structure.

According to the invention, the means or device 22 for depositing the aqueous solution containing amphiphilic macromolecules deposits the amphiphilic macromolecules at conditions under which a shearing stress is applied to the aqueous solution. A description of an exemplary process of applying an amphiphilic macromolecule (e.g., amphiphilic protein) coating to a substrate may be found in U.S. Pat. No. 5,494,744, entitled "Method of Applying a Protein Coating to a Substrate and Article Thereof", previously incorporated by reference.

The liquid depositing device 22 may be composed of at least one liquid distribution element 24. For example, multiple liquid distribution elements 24 may be arranged in series. The liquid distribution element 24 may be a spillway adapted to produce a stream or shower of the aqueous solution of amphiphilic macromolecules so that it is under shear stress conditions as it contacts the fibrous structure. The liquid distribution element 24 may also be one or more nozzles and/or orifices which sprays, squirts, jets or otherwise conveys the aqueous solution so that it is under shear stress conditions as it contacts the fibrous structure. A description of an exemplary liquid distribution element may be found in U.S. Pat. No. 5,486,381, which is assigned to the assignee of the present application, the contents of which are incorporated by reference in their entirety.

Means for applying a vacuum 26 to a second surface 12B of the continuously advancing fibrous structure are located near the liquid deposition element 24. Generally speaking, the vacuum means 26 may be composed of at least one vacuum element 28. Multiple vacuum elements 28 may be arranged in series. The vacuum element 28 may be a conventional vacuum channel or groove such as, for example, a vacuum slot. The vacuum means 26 should be adapted to handle flow rates/volumes of aqueous solution generally corresponding to the flow rates/volumes out of the liquid deposition means 22.

Upon application of the vacuum to the second surface 12B of the fibrous structure, a substantial portion of the aqueous solution containing amphiphilic macromolecules is drawn from the first surface 12A and substantially through the fibrous structure. This passage of the aqueous solution through the fibrous structure is generally thought to generate the shear stress conditions necessary to provide appropriate levels of adsorption of amphiphilic macromolecules onto the individual exposed surfaces of the fibrous structure.

Desirably, the amphiphilic macromolecules are amphiphilic proteins. Generally speaking, the amphiphilic proteins may be selected from classes of globular proteins and/or random coil proteins. For example, the amphiphilic proteins may be milk proteins. Desirably, the amphiphilic proteins may include proteins such as those found in bovine milk including, for example, various caseins and whey proteins.

The fibrous structure containing a coating of amphiphilic macromolecules (e.g., amphiphilic proteins)—called the coated fibrous structure 12' leaves the liquid deposition means 22 and passes to a second means for continuously advancing 30 the coated fibrous structure 12'. The second means for continuously advancing 30 the coated fibrous structure 12' may be similar to the first means for continuously advancing 20 the fibrous structure 12 or may even be unnecessary if the first means for continuously advancing 20 the fibrous structure is extended to run through the entire process. It is also contemplated that the fibrous structure 12 may be self supporting and need not be transported on a moving belt.

The coated fibrous structure 12' passes through a means or device 32 for contacting the sheet 12' with a liquid containing chemical charge modifiers. A description of an exemplary process of applying chemical charge modifiers to an amphiphilic macromolecule (e.g., amphiphilic protein) coated substrate may be found in U.S. patent application Ser. No. 08/548,855, filed on Oct. 25, 1995, entitled "Method of Applying Chemical Charge Modifiers to a Substrate and Article Thereof", previously incorporated by reference.

The liquid contacting or depositing device 32 may be composed of at least one liquid distribution element 34. For example, multiple liquid distribution elements may be arranged in series. The liquid distribution element 34 may be similar to the liquid distribution element 24. For example, it may be a spillway adapted to produce a stream or shower, or one or more nozzles and/or orifices which sprays, squirts, jets or otherwise conveys the liquid containing the chemical charge modifiers. It is contemplated that the liquid distribution element 34 may be composed of a reservoir of the liquid containing chemical charge modifiers designed so that the coated fibrous structure 12' passes over either an interior or exterior surface across one or more openings or orifices which provides contact with the liquid. It is also contemplated that the liquid distribution element may be a reservoir of the aqueous solution into which the coated fibrous structure 12' such as, for example, a dip tank or trough. A variety of other reservoir and spillway configurations are contemplated and could generally be determined by one of ordinary skill in the art.

The liquid containing chemical charge modifiers contacts the coated fibrous structure 12' and the chemical charge modifiers adsorb or become incorporated onto the amphiphilic macromolecule (e.g., amphiphilic protein) coating. For example, when the chemical charge modifiers are polyvalent cations and/or positively charged particles in a liquid having a dielectric constant sufficient for separate charged particles to exist, at least a portion of the cations or positively charged particles become incorporated onto a negatively charged amphiphilic macromolecule (e.g., amphiphilic protein) coating on the coated fibrous structure 12' to yield a chemically charge-modified fibrous structure 40.

The chemical charge modifiers may also be cationic polymers such as, for example, quaternary amine containing cationic resins, aliphatic amines having at least one primary amine and/or secondary amine, and the like. Exemplary cationic polymers include, but are not limited to, polyamine epichlorohydrins such as dimethyl amine epichlorohydrin resin (Reten® 201) available from Hercules, Wilmington Del. The chemical charge modifiers may also be cationic polymer systems composed of a primary polymer material and a secondary polymer material. For example, the cationic polymer system may be composed of a primary polymer material such as polyamine epichlorohydrin and a secondary polymer material such as tetraethylene pentamine. An exemplary primary polymer material is dimethyl amine epichlorohydrin resin (Reten® 201) available from Hercules, Wilmington Del. The primary polymer material may be applied in solution at concentrations that may vary from about 0.04 wt. % up to about 50 wt. %. The secondary polymer material (e.g., tetraethylene pentamine (TEPA)) may also be applied in solution in solution at concentrations that may vary from about 0.01 wt. % to greater than 1 wt. %. For example, the TEPA solution may have a concentration much greater than 1.0 wt. % (e.g., 5 wt. %, 10 wt. % or greater).

Liquid is removed from the chemically charge-modified fibrous structure 40 by means for applying a vacuum 36 which may be composed of one or more vacuum elements 38. The design and arrangement of the means for applying a vacuum 36 may be similar to that of the vacuum means 26.

The chemically charge-modified fibrous structure 40 may then be passed to a drying operation (not shown). Exemplary drying operations include processes which incorporate infrared radiation, yankee dryers, steam cans, microwaves, hot-air and/or through-air drying techniques, and ultrasonic energy.

Figure 2:
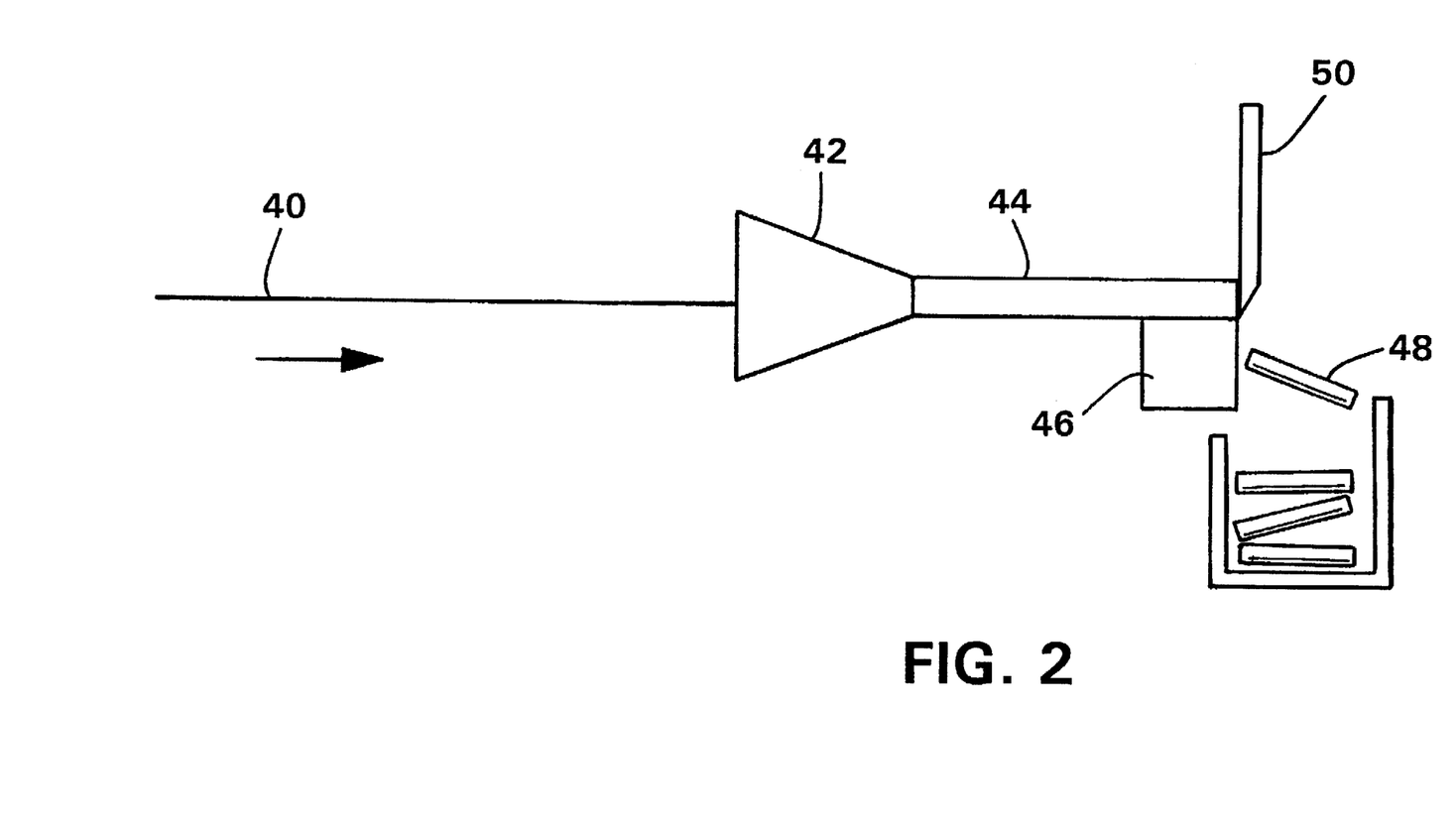
FIG. 2 is an illustration of an exemplary process of making a water purification filter.

As shown schematically in FIG. 2, the chemically charge-modified fibrous structure 40 may be drawn into a pre-forming apparatus 42 that gathers or folds the flat fibrous structure 40 into a cylindrical shape 44 suitable for passage into a conventional filter rod maker. Although a cylindrical shape is described, the filter of the present invention should not be limited to any particular shape or configuration.

The formed cylinder 44 is usually carried into a rod-making garniture along with a liquid impermeable wrapping paper 46 via an endless forming belt (not shown). Prior to entering the garniture, a continuous bead of adhesive is applied to one edge of the wrapping paper 46 via an applicator. As these components pass through the garniture, the formed web is compressed into a cylindrical cross-sectional rod while at the same time being enveloped by the wrapping paper 46. As the adhesive bead contacts the overlap section of wrapped rod, it is sealed by means of a sealing bar. This endless filter rod is then cut into lengths 48 by means of a blade 50.

The liquid impervious wrapper surrounding the filter plug may be a latex saturated cellulose sheet, a wax saturated cellulose sheet, a plastic film (e.g., extruded film or coating) or similar material. The liquid impervious wrapper may be a non-structural element of the device (i.e., add little or no structural integrity to the filter other than to hold the filter material together).

Figure 3:
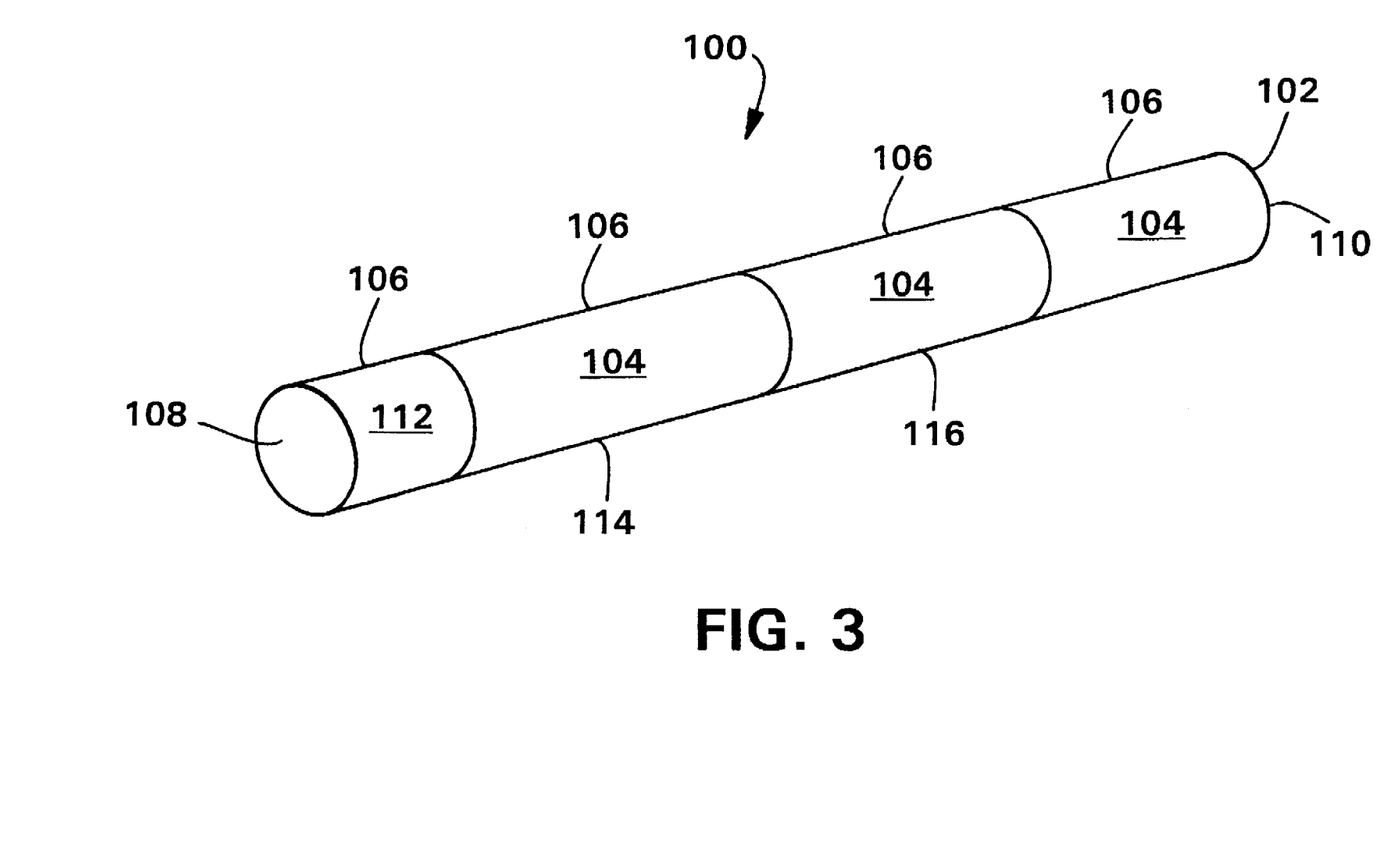
FIG. 3 is an illustration of an exemplary water purification filter.

Referring now to FIG. 3 of the drawings, there is illustrated at 100 a water purification device 102 composed of a filter plug 104 formed from fibrous structure containing integrated water purification material. The device 102 is covered with a liquid impermeable wrapper 106 and is open at a first end 108 and a second end 110. In embodiments where the device 102 is in the form of a drinking straw, one of the ends may be designated as a drinking end.

The device 102 may be composed entirely of a single filter plug formed from the fibrous structure or the device may be divided into discrete segments formed of the same or different materials.

A pre-filter 112 composed of sand, diatomaceous earth, or similar particulate material may be located at one end of the device 102. The pre-filter 112 removes gross contaminants such as sediments, large organic material or the like. A portion of the filter plug may be treated with a disinfectant to form a disinfectant zone 114. Alternatively and/or additionally, a discrete segment of a suitable disinfectant material may be used to form the disinfectant zone 114. Generally speaking, the disinfectant should be adapted to render harmless a substantial portion of pathogens contained in the water as it moves through the device. The disinfectant may be selected from solid iodine, iodine compounds, phenols, halazone or quaternary ammonium compounds.

The device 102 may contain a microbe removal zone 116. The microbe removal zone 116 may be a section of a filter plug formed from a fibrous structure treated with a charge modifier. Alternatively and/or additionally, a discrete segment of a suitable microbe removal material may be used to form the microbe removal zone 116. A wide variety of microbe removal materials may be used. An exemplary material is a nonwoven web with a chemical charge-modifier material integrated in the web.

According to the invention, the water purification device may be made of multiple filter plugs arranged in series. The water purification device may also include an adsorbent particulate material. In an embodiment of the invention, the adsorbent particulate material may be located between filter plugs.

Figure 4:
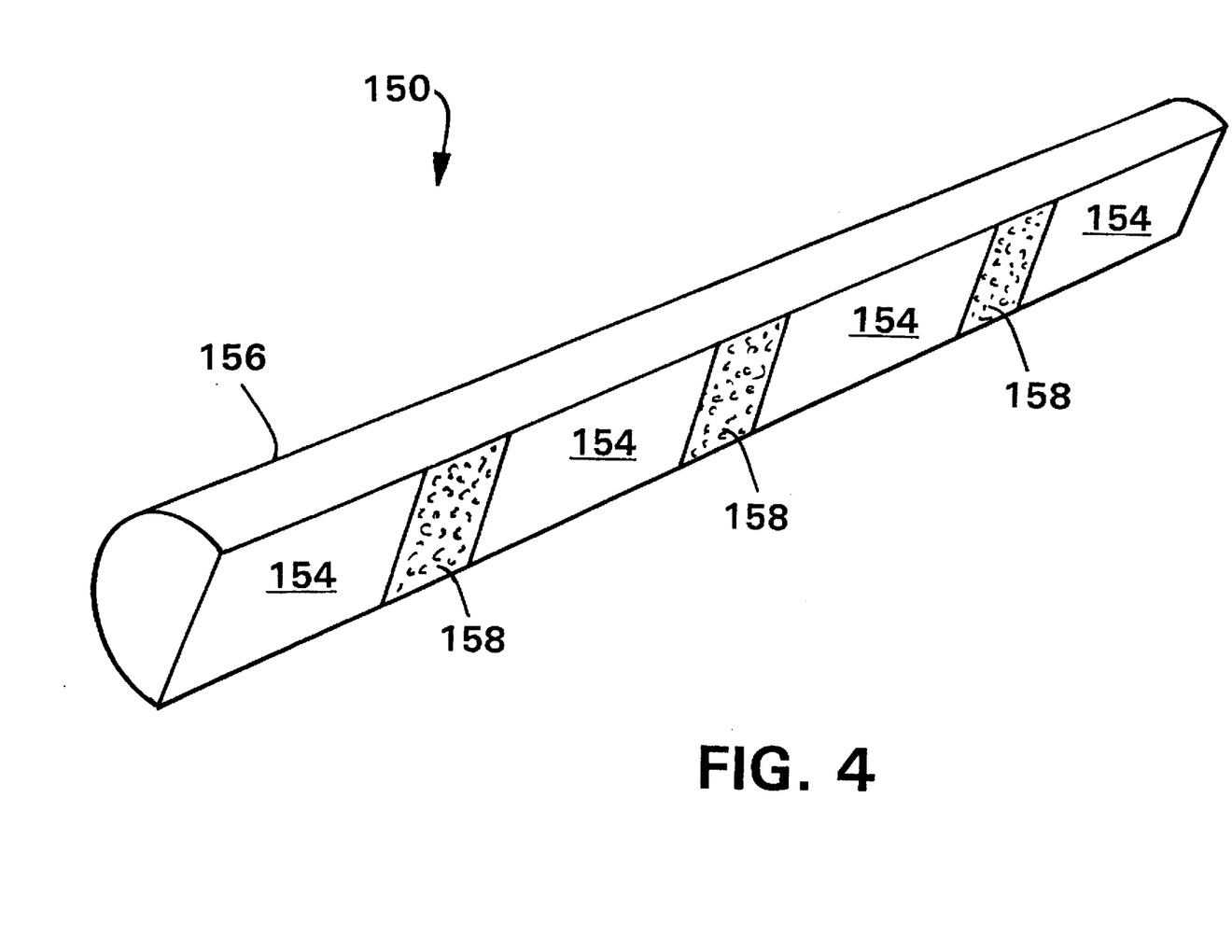
FIG. 4 is a cross-sectional illustration of an exemplary water purification filter.

Referring now to FIG. 4 of the drawings, there is illustrated at 150 a cross-section of a water purification device 152 composed of a series of filter plugs 154 formed from fibrous structure containing integrated water purification material. The device 152 is covered with a liquid impermeable wrapper 156 and is open at a first end and a second end. In embodiments where the device is in the form of a drinking straw, one of the ends may be designated as a drinking end. A particulate material 158 may be located between the filter plugs 154. The particulate material may be an adsorbent material, disinfectant material or the like.

The water purification device may be in the form of a single use, disposable drinking straw or in any other form such as, for example, a cartridge that forms part of a package for liquids (e.g., beverages), or part of a water processing or distribution system. Of course, many water purification devices may be arranged in parallel to process larger flows of water. When used in the cartridge format, the water purification device may be a cartridge that can be dropped into a holder designed to completely envelop the device and direct water into and away from the device. Alternatively, the water purification device may be covered by a liquid impermeable wrapper that has sufficient strength to eliminate the need for a cartridge holder. In such case, the water purification device could become a distinct stage or section of a water processing or distribution system.

The present invention is further described by the examples which follow. Such examples, however, are not to be construed as limiting in any way either the spirit or the scope of the present invention.

EXAMPLES

A nonwoven web of meltblown polypropylene fibers was prepared in accordance with the teachings of U.S. Pat. No. 4,961,415, entitled "Controlled Draft and Efficiency Filter Element for Smoking Articles" to F. R. Radwanski et al., issued on Oct. 9, 1990, previously incorporated by reference. The nonwoven web had a basis weight of approximately 0.7 ounces per square yard (osy).

The nonwoven web was formed into a cylindrical filter plug utilizing a conventional cigarette filter plug making apparatus. The filter plug was approximately 124 mm long and has a diameter of approximate 8 mm. The filter plug was wrapped with a liquid impermeable paper sheet having a basis weight of about 110 grams per square meter (gsm). A bead of Elmers® glue (Borden, Inc.) was used to join and adhere the ends of the wrapper. A silicone water repellent was brushed over the exterior of the seam. The paper sheet contained about 2 percent, by weight, precipitated calcium carbonate, and had a polyvinyl alcohol coating that made up about 10 percent, by weight, of the paper.

Water pressure drop through the straw was determined utilizing a Dwyer Slack-tube® manometer (0.36 inches, water-filled) available from Dwyer Instruments, Inc., Michigan City, Ind., connected to a Gilmont® flowmeter (tube size 4, D-4646) available from Gilmont Instruments, Inc., Barrington, Ill. This equipment was connected to a source of distilled water.

According to the equipment set-up, the water pressure drop through a filter approximately 124 mm long at a flow rate of 0.17 liter/minute was measured at 31.5 cm water. This corresponds to a water pressure drop of approximately 2.5 cm water per cm of filter length.

The nonwoven web of meltblown polypropylene fibers was treated with milk protein in accordance with U.S. Pat. No. 5,494,744, entitled "Method of Applying a Protein Coating to a Substrate and Article Thereof," issued to Everhart et al. on Feb. 27, 1996, previously incorporated by reference. The milk protein modified nonwoven web of meltblown polypropylene fibers was further treated with a cationic polymer system composed of dimethyl amine epichlorohydrin and tetraethylene pentamine. The dimethyl amine epichlorohydrin resin (Reten® 201) is available from Hercules, Wilmington Del., and was applied in solution. The solution concentration may vary from about 0.04 wt. % up to about 50 wt. %. The tetraethylene pentamine (TEPA) was also applied in solution. The concentration of the TEPA solution may vary from about 0.01 wt. % to greater than 1 wt. %. For example, the TEPA solution may have a concentration much greater than 1.0 wt. % (e.g., 5 wt. %, 10 wt. % or greater).

Drinking straw filters containing the Reten® /TEPA treated, milk protein modified nonwoven web of meltblown polypropylene fibers were tested for their ability to filter or remove polio virus, *Vibrio cholera* and MS-2 bacteriophage from separate aqueous solutions. The drinking straw filters were attached to a vacuum which provided suction sufficient to draw 50 mL of a test solution through the drinking straw filter and into a trap. The flow rate of the solution through the drinking straw filter was approximately 3 mL/second.

The filtrate was assayed using conventional microbiological assay techniques. Results of the tests are reported in Table 1.

TABLE 1

| Organism | log reduction | initial titer |
|---|---|---|
| MS-2 bacteriophage | 2.5 | $2 \times 10^4$ |
| polio virus | 0 | $2 \times 10^4$ |
| *Vibrio cholerae* | >3 | $3 \times 10^3$ |

As can be seen from the results shown in Table 1, a satisfactory removal of waterborne pathogens may be accomplished with a portable, convenient, inexpensive water purification device.

Water filtration devices (e.g., drinking straw filters) of the present invention exhibit an ability to remove substantial portions of waterborne pathogens from aqueous liquid contaminated with such waterborne pathogens. For purposes of the present invention, the expression "removing a substantial portion of waterborne pathogens from water contaminated with such waterborne pathogens" generally refers to removal of at least about 90 percent of the waterborne pathogens. In many instances, and as shown above, the removal rate will be significantly greater. For example, in some cases removal rates of 99 percent (a log 2 reduction) have been achieved. Removal rates of 99.9 percent (log 3 reduction) have also been achieved. Removal rates of 99.99 percent (log 4 reduction), 99.999 percent (log 5 reduction) or even greater are within the scope of the present invention.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A device that purifies contaminated water by forced movement of water through the device, the device comprising:

at least one filter plug composed of a fibrous structure, the filter plug having sides, a first end, a second end, and a firmness sufficient to avoid collapse of the fibrous nonwoven structure under a pressure drop of from about 0.5 to about 22 cm water/cm filter plug length;

a water purification material integrated in the fibrous structure; and a liquid impervious wrapper covering the sides of each filter plug, the wrapper defining openings at the first and second ends of the filter plug.

2. The water purification device of claim 1, wherein the fibrous structure is selected from a nonwoven web of meltblown fibers, a nonwoven web of spunbond filaments, a bonded-carded web, a fibrous batt, a filament tow and an airlaid web.

3. The water purification device of claim 1, wherein filter plug has a diameter ranging from about 1 cm to about 10 cm.

4. The water purification device of claim 1, wherein filter plug has a firmness value of about 0.3 to about 0.8 millimeters deflection.

5. The water purification device of claim 1, wherein the water purification material is chemically charge modified.

6. The water purification device of claim 5, wherein the chemically charge-modified water purification material contains a chemical charge modifier selected from polyvalent cations, cationic polymers, and positively-charged particles.

7. The water purification device of claim 1, wherein the liquid impervious wrapper is selected from a latex saturated cellulose sheet, a wax saturated cellulose sheet, and a plastic film.

8. The water purification device of claim 1, further comprising an adsorbent particulate material.

9. The water purification device of claim 1 in which the filter plug comprises multiple filter plugs arranged in series.

10. The water purification device of claim 9 wherein an adsorbent particulate material is located between filter plugs.

11. The water purification device of claim 1 further comprising a disinfectant incorporated in at least a portion of the filter plug, the disinfectant being adapted to render harmless a substantial portion of pathogens contained in the water as it moves through the water purification device.

12. A water purification device comprising a plurality of water purification devices according to claim 1 arranged in parallel.

13. A drinking straw that purifies contaminated water by forced movement of water through the straw, the straw comprising:
    a filter plug composed of a fibrous structure, the filter plug having sides, a first end, a second end, and a firmness sufficient to avoid collapse of the fibrous structure under a pressure drop of from about 0.5 to about 22 cm water/cm filter plug length;
    a water purification material integrated in the fibrous structure; and
    a liquid impervious wrapper covering the sides of the filter plug, the wrapper defining openings at the first and second ends of the filter plug.

14. The drinking straw of claim 13, wherein the fibrous structure is selected from a nonwoven web of meltblown fibers, a nonwoven web of spunbond filaments, a bonded-carded web, a fibrous batt, a filament tow and an airlaid web.

15. The drinking straw of claim 13, wherein filter plug has a diameter ranging from about 5 mm to about 20 mm.

16. The drinking straw of claim 13, wherein filter plug has a firmness value of about 0.3 to about 0.8 millimeters deflection.

17. The drinking straw of claim 13, wherein the water purification material is chemically charge-modified.

18. The drinking straw of claim 17, wherein the chemically charge-modified water purification material contains a chemical charge modifier selected from polyvalent cations, cationic polymers, and positively-charged particles.

19. The drinking straw of claim 13, wherein the liquid impervious wrapper is selected from a latex saturated cellulose sheet, a wax saturated cellulose sheet, and a plastic film.

20. The drinking straw of claim 13 further comprising an adsorbent particulate material.

21. The drinking straw of claim 13 in which the filter plug comprises multiple filter plugs arranged in series.

22. The drinking straw of claim 20 wherein an adsorbent particulate material is located between filter plugs.

23. The drinking straw of claim 13 further comprising a disinfectant incorporated in at least a portion of the filter plug, the disinfectant being adapted to render harmless a substantial portion of pathogens contained in the water as it moves through the drinking straw.

24. A drinking straw that removes waterborne pathogens from aqueous liquid by forced movement of water through the straw, the straw comprising:
    a filter plug composed of a nonwoven web selected from a nonwoven web of meltblown fibers and nonwoven web of spunbond filaments, the filter plug having sides, a first end, a second end, and a firmness sufficient to avoid collapse of the nonwoven web under a pressure drop of from about 0.5 to about 22 cm water/cm filter plug length;
    a chemical charge modifier integrated in the nonwoven web; and
    a liquid impervious wrapper covering the sides of the filter plug, the wrapper defining openings at the first and second ends of the filter plug,
    so that when water containing waterborne pathogens is forced through the drinking straw, the waterborne pathogens are adsorbed onto the nonwoven web containing a chemical charge-modifier.

25. The drinking straw of claim 24, wherein the chemical charge modifier is selected from polyvalent cations, cationic polymers, and positively-charged particles.

26. The drinking straw of claim 25, wherein the polyvalent cations are selected from $Ca^{2+}$, $Al^{3+}$, and $Bi^{3+}$.

27. The drinking straw of claim 25, wherein the positively-charged particles are selected from single metal hydroxides, mixed metal hydroxides, and sol-gels.

28. The drinking straw of claim 25, wherein the cationic polymers comprise quaternary amine containing cationic resins.

29. The drinking straw of claim 25, wherein the cationic polymers further comprise aliphatic polyamines having at least one primary amine and/or secondary amine.

30. The drinking straw of claim 25, wherein the cationic polymers comprise polyamine epichlorohydrin.

31. The drinking straw of claim 24, wherein the liquid impervious wrapper is selected from a latex saturated cellulose sheet, a wax saturated cellulose sheet, and a plastic film.

32. The drinking straw of claim 24, further comprising an adsorbent particulate material.

33. The drinking straw of claim 24, wherein the filter plug comprises multiple filter plugs arranged in series.

34. The drinking straw of claim 33, wherein an adsorbent particulate material is located between filter plugs.

35. The drinking straw of claim 24, further comprising a disinfectant incorporated in at least a portion of the filter plug, the disinfectant being adapted to render harmless a substantial portion of pathogens contained in the water as it moves through the drinking straw.

36. The drinking straw of claim 35, wherein the disinfectant is selected from the group consisting of solid iodine, iodine compounds, phenols, halazone or quaternary ammonium compounds.

37. The drinking straw of claim 35, wherein the pathogens are selected from the group consisting of *Vibrio cholerae*, *Giardia lamblia*, Cryptosporidium, Salmonella, fecal coliforms, reovirsus, adenoviruses, hepatitis A and coxsackie.

* * * * *